(12) United States Patent
Cruz Oliveira Queiros et al.

(10) Patent No.: US 10,379,894 B1
(45) Date of Patent: Aug. 13, 2019

(54) LINEAGE-BASED TRUST FOR VIRTUAL MACHINE IMAGES

(71) Applicant: AMAZON TECHNOLOGIES, INC., Seattle, WA (US)

(72) Inventors: Armando Jose Cruz Oliveira Queiros, Seattle, WA (US); Hart Matthew Rossman, Vienna, VA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 15/277,878

(22) Filed: Sep. 27, 2016

(51) Int. Cl.
| | |
|---|---|
| *G06F 9/455* | (2018.01) |
| *G06F 21/50* | (2013.01) |
| *G06F 21/51* | (2013.01) |
| *G06F 21/52* | (2013.01) |
| *G06F 21/55* | (2013.01) |
| *G06F 21/56* | (2013.01) |
| *G06F 21/64* | (2013.01) |
| *H04L 29/06* | (2006.01) |
| *G06F 21/57* | (2013.01) |

(52) U.S. Cl.
CPC .......... *G06F 9/45558* (2013.01); *G06F 9/455* (2013.01); *G06F 9/45533* (2013.01); *G06F 21/50* (2013.01); *G06F 21/51* (2013.01); *G06F 21/52* (2013.01); *G06F 21/556* (2013.01); *G06F 21/56* (2013.01); *G06F 21/57* (2013.01); *G06F 21/64* (2013.01); *H04L 63/00* (2013.01); *H04L 63/08* (2013.01); *H04L 63/0876* (2013.01); *G06F 2009/4557* (2013.01); *G06F 2009/45575* (2013.01); *G06F 2009/45587* (2013.01); *G06F 2009/45591* (2013.01)

(58) Field of Classification Search
CPC .. G06F 9/455; G06F 9/45533; G06F 9/45558; G06F 2009/45575; G06F 2009/45587; G06F 21/50; G06F 21/51; G06F 21/52; G06F 21/556; G06F 21/56; G06F 21/505; G06F 21/57; G06F 21/64; H04L 63/00; H04L 63/08; H04L 63/0876
See application file for complete search history.

(56) References Cited

U.S. PATENT DOCUMENTS

| | | | | |
|---|---|---|---|---|
| 7,516,331 | B2 * | 4/2009 | Jin | G06F 21/51 713/187 |
| 7,810,092 | B1 * | 10/2010 | van Rietschote | G06F 9/45558 709/217 |
| 7,836,299 | B2 * | 11/2010 | England | G06F 21/57 713/162 |
| 9,954,875 | B2 * | 4/2018 | Boivie | G06F 21/53 |

(Continued)

*Primary Examiner* — Charles M Swift
(74) *Attorney, Agent, or Firm* — Blank Rome LLP (57) ABSTRACT

A lineage-based trust for machine images that are derived from another may be established to validate a machine within the lineage before it is used to launch a virtual machine. An offspring machine image may be derived from a parent machine image through modifications made to the parent machine. Further, an integrity metric may be computed for each such modification and a data structure may be provided through which the parent and offspring machine images can be linked. When a customer of a provider network requests a virtual machine to be launched using a specified machine image, the specified machine image is loaded on to a host computer and validated using the associated integrity metrics before the virtual machine is launched.

20 Claims, 8 Drawing Sheets

(56) References Cited

U.S. PATENT DOCUMENTS

| | | | | |
|---|---|---|---|---|
| 2007/0294676 | A1* | 12/2007 | Mellor | G06F 8/65 |
| | | | | 717/139 |
| 2008/0134176 | A1* | 6/2008 | Fitzgerald | G06F 9/45537 |
| | | | | 718/1 |
| 2011/0219447 | A1* | 9/2011 | Horovitz | G06F 9/45533 |
| | | | | 726/22 |
| 2011/0265076 | A1* | 10/2011 | Thorat | G06F 8/65 |
| | | | | 717/172 |
| 2012/0304244 | A1* | 11/2012 | Xie | G06F 21/00 |
| | | | | 726/1 |
| 2013/0042115 | A1* | 2/2013 | Sweet | H04L 63/0428 |
| | | | | 713/176 |
| 2014/0053245 | A1* | 2/2014 | Tosa | H04L 63/08 |
| | | | | 726/4 |
| 2014/0096134 | A1* | 4/2014 | Barak | G06F 9/45558 |
| | | | | 718/1 |
| 2015/0052520 | A1* | 2/2015 | Crowell | G06F 21/53 |
| | | | | 718/1 |
| 2015/0081910 | A1* | 3/2015 | Assuncao | G06F 9/45558 |
| | | | | 709/226 |
| 2015/0256341 | A1* | 9/2015 | Ye | H04L 41/0803 |
| | | | | 713/164 |
| 2017/0078250 | A1* | 3/2017 | Barsness | H04L 63/0428 |
| 2017/0097828 | A1* | 4/2017 | Kim | G06F 9/4406 |
| 2017/0103212 | A1* | 4/2017 | Deng | G06F 21/577 |

* cited by examiner

LINEAGE-BASED TRUST FOR VIRTUAL MACHINE IMAGES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine (e.g., a server) to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

Customers of a service provider can request the service provider's network to launch virtual machines on host computers owned and controlled by the service provider. Virtual machines typically are launched using an underlying machine image which comprises a binary that represents the guest operating system, drivers, applications, etc.

BRIEF DESCRIPTION OF THE DRAWINGS

For a detailed description of various examples, reference will now be made to the accompanying drawings in which.

DETAILED DESCRIPTION

As noted above, virtual machines (also called virtual machine instances or instances) are launched from machine images. In the context of a cloud service provider, the service provider's network may store multiple different types of machine images. In some cases, machine images may be provided by third parties. When a customer of the service provider wants to launch a virtual machine, the customer submits a launch request, such as in the form of a request to an application programming interface (API). The request may include an identifier (ID) of a particular machine image to use to launch the virtual machine. A host computer is selected on which to execute the virtual machine, and the machine image is copied onto the storage medium (e.g., hard drive) of the host computer. The virtual machine then can be launched (e.g., operating system booted, ports enabled, an internet protocol (IP) address attached to the virtual machine, drivers installed, and applications executed).

Further, once a virtual machine is launched using a particular machine image, the user of the virtual machine can make modifications to the virtual machine. For example, a user might opt to load and install a software agent such as an antivirus software agent into the virtual machine. The user might opt to install a security patch for the operating system or modify a configuration setting such as a firewall rule. After modifying the virtual machine instance, the user then might want to save the machine image in, for example, a storage service on the provider network, so that future virtual machines can be launched using the same modified machine image. In some cases, a series of modified machine images may be established starting with a base machine image. A first generation machine image may be created as a result of modifications made to the base machine image. A second generation machine image may be created as a result of modifications made to the first generation machine image, and so on. For example, a corporate or other type of entity may use virtual machines created by them on a service provider network. Information technology (IT) specialists, or other personnel, may create the various generations of machine images for use by the users within the corporation.

Each machine image thus provides the basis of the virtual machine. Any defects, malware, or other types of undesirable issues in a machine image may be problematic for the virtual machine and the customer using the virtual machine. Further complicating the problem of a machine image with a defect is the possibility that that machine image may have served as the basis for offspring generations of machines as noted above. The disclosed embodiments implement a mechanism by which trust of the machine image by the customer can be established before the machine image is used to launch an instance. In at least some embodiments, a lineage-based trust is established for a hierarchy of machines in which each machine image, other than the base machine image, is derived from a parent machine image.

In the disclosed embodiments, each machine image in the lineage is mapped to a manifest which specifies those modifications that were made to a virtual machine launched from a parent machine image to create the offspring machine image. The modifications listed in the manifest were made to the machine image's parent machine image. Any given machine image may be derived from a parent machine, which itself may be derived from its parent machine image, and so on. In addition to the manifests, which indicate the modifications made to one machine image to create its offspring machine image, "chain" information also be stored which may include identifiers of all of the ancestors to the offspring machine image. Between the chain information and the manifests for the various machines images in a given chain, all modifications made to ancestor machine images that are present in a given offspring machine image can be validated to ensure they are still present in the offspring machine image.

For example, a chain of machine images may include three machine images including a base (or grandparent) machine image, a first generation (or parent) machine image, and a second generation (or offspring) machine image. Each such machine image is associated with its own manifest. The base machine image's manifest may specify all of the software agents (e.g., operating system version, drivers, applications, etc.) and configuration parameters that are included in the base machine image. Software agents may be specified by way of a path from the root to the executable filed comprising the software agent. The configuration parameters may be stored in one or more configuration files and the manifest may include the path to the configuration file(s). The first generation machine image is created from modifications made to the base machine image. The manifest for the first generation machine image may include an identification of the specific modifications made to the base machine image—with the assumption being that in all respects other than the modifications, the first generation machine image is identical to the base machine image. Similarly, the second generation machine image is created from modifications made to the first generation machine image, and the manifest for the second generation machine image includes identifications of the modifications made to the first generation machine image. Thus, the manifest for the base machine image may have a full catalog of the software components and configuration parameters contained with that image, while the manifest for the descendent machine images specify the changes made relative to their immediate parent machine images. A data structure also may be implemented which includes, for each machine image, identifiers of ancestors machine images for each such machine image. Thus, the chain information for the first generation machine image includes an identifier of its parent—the base machine image, and the chain information of the second generation machine image includes identifiers of both of its ancestor machine images—the first generation machine image and the base machine image.

In addition to the identifiers of the various modifications made to its parent machine image, each manifest also includes an integrity metric associated with each software agent or configuration parameter. Each such integrity metric is uniquely computed based on the corresponding software agent or configuration parameter. In some embodiments, the integrity metric is a hash value (i.e., a hash computed of the particular software agent or file containing the configuration parameter). The integrity metric for a given software agent/configuration parameter may be computed within the host computer that executes the virtual machine being modified with the particular software agent/configuration parameter.

An access control data structure may be maintained within the service provider network that includes the various machine image manifests. When a customer attempts to launch an instance using a target machine image, various validity checks regarding the machine image may be performed before the instance is launched on a host computer. For example, a service within the provider network may cause a copy of the target virtual machine and its manifest to be transmitted to a host computer and, before launching the instance on the host, a virtual machine validation agent executing on the host computer may compute an integrity metric of each software agent or set of configuration parameters contained within the machine image that is listed in the manifest of the target machine image. The virtual machine validation agent then may compare its computed integrity metric(s) to the corresponding integrity metric(s) contained in the manifest. If a mismatch is detected, the instance is not permitted to launch. If all integrity metrics within the manifest are successfully validated, then the instance may be permitted to launch on the host computer. Additional validation checks may be made of the target machine image to confirm that, other than the modifications listed in the manifest of the target machine image, the target machine image is otherwise identical to its parent machine image. This lineage-based trust mechanism described herein provides customers an increased level of trust before their virtual machines are launched.

Figure 1:
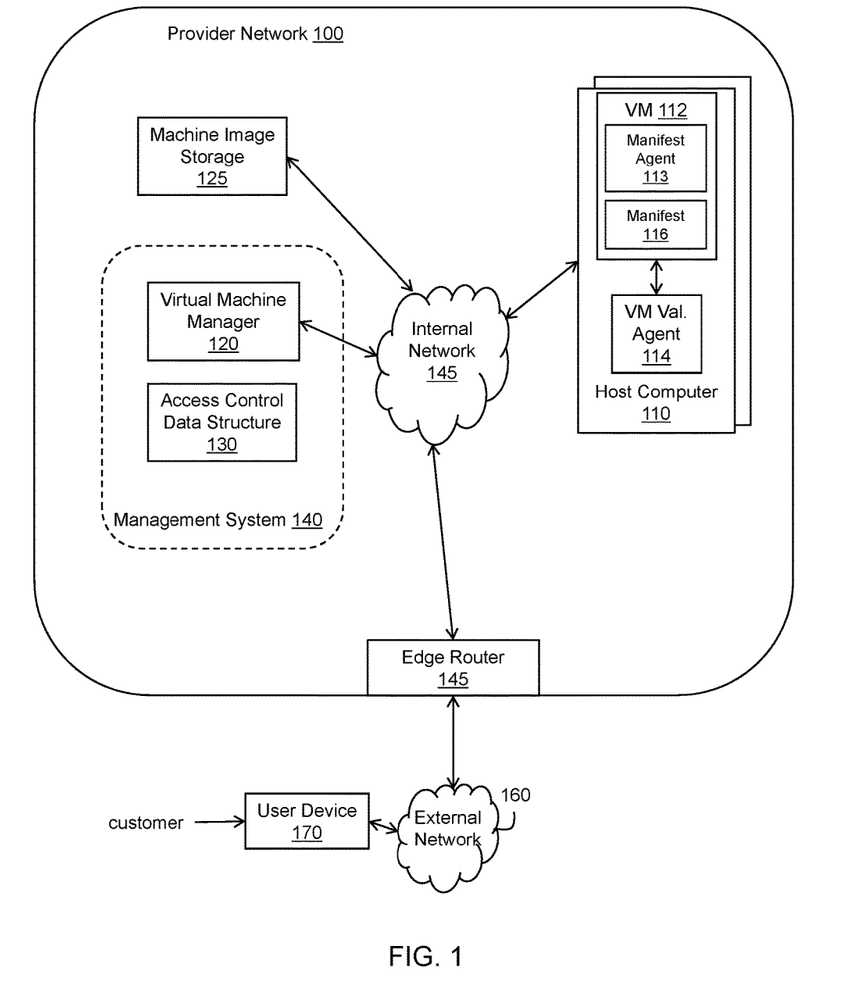
FIG. 1 shows a system in accordance with various examples.

FIG. 1 illustrates a service provider network 100 in accordance with various embodiments. The provider network 100 may include multiple host computers 110, a virtual machine manager 120, a machine image storage 125, an access control data structure 130, and an internal network 145. The virtual machine manager 120 and access control data structure 130 may be part of a management system 140, and other components may be included as well in the management system. The internal network 145 may include one or more switches, routers, and other types of networking devices. The various components of the provider network 100 such as the host computers 110, the machine image storage 125, and the access control data structure 130 may communicate with each other via the internal network 145.

The host computers 125 may include servers or other types of computing devices. Each host computer 125 includes one or more processors, memory, network ports, and other hardware and software components. The machine image storage 125 comprises a storage drive system that includes one or more storage drives (e.g., magnetic storage, solid state storage, etc.) on which machine images may be stored for use by customers of the service provider to launch virtual machines. The access control data structure 130 may comprise any suitable type of data structure such as a database, a flat file, etc. As explained below, the manifests associated with the various machine images may be stored in the access control data structure 130. The access control data structure 130 may be stored in the same storage drive system as machine image storage 125, or on a separate storage drive. Collectively, the storage devices which store the access control data structure and the machine images represent a storage subsystem.

Customers and users of the provider network 100 can access the resources of the provider network via their own user devices 170 by way of an external network 160. The external network 160 may comprise a local area network, wide area network, wired or wireless networks, the internet, etc. An edge router 145 within the provider network 100 provides communication connectivity to the user devise 170 via the external network 160. The user devices 170 may include personal computers (e.g., desktop computers, notebook computers, etc.), smart phones, tablet devices, personal digital assistants, etc. Each user device 170 may include a processor, memory and storage and may execute a browser application to access the resources within the provider network.

The provider network 100 implements various cloud-related services that can be purchased or otherwise used by customers of the service provider. For example, customers can request that virtual machines 112 be launched on host computers 110. Through interaction with the user's user device 170, a user can submit requests to the virtual machine manager 120. The virtual machine manager 120 may comprise a single service or a collection of services executing on one or more computing devices (e.g., servers). The virtual machine manager may implement a user interface service to communicate with user devices 170, as well as a virtual machine management service usable to launch virtual machines, terminate virtual machines, re-configure virtual machines, etc. The interaction between the user device 170 and the virtual machine manager 120 may comprise a graphical console displayed on a display of the user device. The graphical console may be generated as web pages by the virtual machine manager 120, or other user interface services within the management system 140, and transmitted to the user device 170 in the form of HyperText Markup Language (HTML) code which causes a browser on the user device to display the web pages. In other embodiments, the user device 170 may implement a command line interface by which a customer can submit commands such as requests to application programming interfaces (APIs). In yet other embodiments, a customer may submit a script to the virtual machine manager containing one or more commands (e.g., API requests).

The virtual machine manager 120 thus can receive launch requests from a customer via a user device 170. A launch request may indicate that one or more virtual machines 112 are to be launched on one or more host computers 110 for use by the customer. A launch request may specify a variety of parameters used to create the virtual machines for the customer. For example, the customer may specify the number of virtual machines desired, the type of virtual machines to be launched (e.g., number of central processing units (CPUs) per virtual machine, amount of memory, whether the instance has local hard drive storage and how much storage, etc.), a pricing option for the virtual machines (to the extent that service provider offers varying pricing options to its customers), a data center or region in which to launch the virtual machines, etc.

The launch parameters also may include an identifier of a machine image used to launch the virtual machine. Each machine image may be assigned a unique identifier (ID) and a list of the various machine images and their characteristics may be made available to the customer on the user device 170. The machine image storage 125 may store the various machine images usable by the service provider's customers. The customer may select the machine image deemed most suitable for the application and computational needs of the customer, and the customer may include that machine image's ID in the launch request. The virtual machine manager 120 selects one or more host computers 110 to host the virtual machines in accordance with the launch parameters specified by the customer and requests a copy of the target machine image to be copied from the machine image storage 125 to the selected host computer 110, or causes a copy of the target machine image to be loaded on to multiple host computers for customers that desire multiple virtual machines to be launched on more than one host computer.

Once the target machine image is copied on to the hard drive of the selected host computer, a validation process to confirm the integrity of the machine image may be performed as described below. Once the validation process is successfully completed, the virtual machine is then launched using the machine image. Launching a virtual machine may include allocating resources (e.g., CPU, memory, network ports, etc.), for example, by a hypervisor, for use by the virtual machine, booting the guest operating system within the machine image, enabling network ports, applying configuration parameters such as an IP address and firewall rules, etc. Once the virtual machine is launched, the customer can then use it to load and execute applications (although the machine image can include applications as well).

As noted above, a machine image may be derived from a parent machine image. That is, a customer may submit a launch request to launch a virtual machine using a particular machine image. The customer then may modify the virtual machine such as adding or changing a firewall rule, downloading and applying a security patch for the operating system, etc. The customer then may want to save the modified virtual machine as a new machine image in the machine image storage 125 so that that machine image can be used to launch additional virtual machines and thus avoid having to re-use the original parent machine image and repeat the implementation of the same modifications. Instead, the newly created offspring machine image can be used to launch virtual machines from that point forward.

Figure 2:
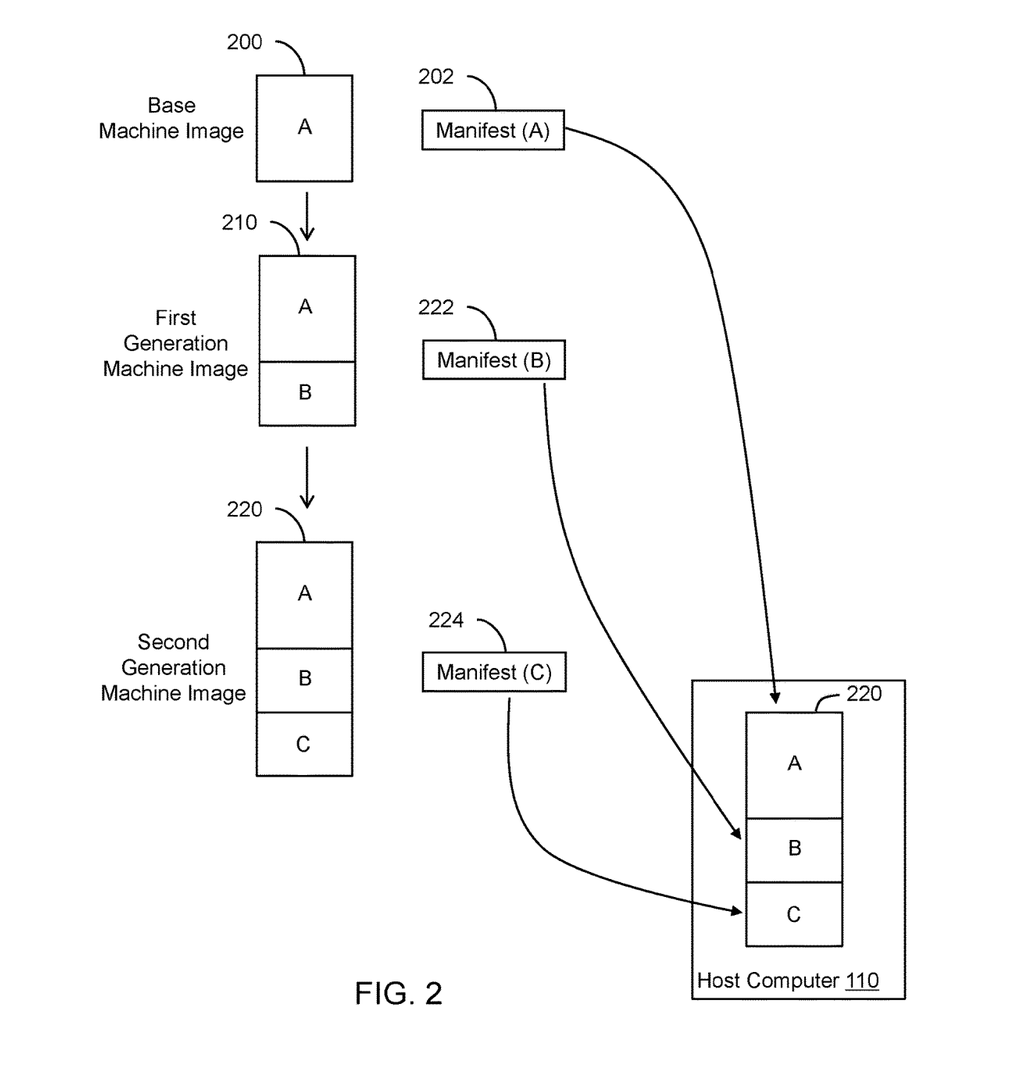
FIG. 2 shows a chain of machine images and associated manifests in accordance with various examples.

In some embodiments, a manifest may be created for some or all of the machine images stored in the machine image storage 125. The manifests may be stored in the access control data structure 130. Each manifest provides an indication of at least some of the software components and/or configurations contained within the respective machine image. FIG. 2 shows an example of chain of machine images comprising a base machine image 200, a first generation machine image 210, and a second generation machine image 220. The base machine image 200 is a binary that includes various software components (e.g., operating system, drivers, etc.) and configuration parameters that are collectively represented in FIG. 2 as "A." A manifest 202 has been created for base machine image 200. As machine image 200 is the base machine image, the manifest 202 contains a list of all of the software components and configuration parameters contained in that machine image. The manifest 202 of the base machine image 200 may include an identifier of each software component (e.g., the operating system, specific drivers, etc.) contained within "A." The manifest also may include an integrity metric associated with each such software component. Each integrity metric may be computed using the underlying software component. In one example, an integrity metric may comprise a hash value computed using the corresponding software component. In such embodiments, the manifest includes a separate hash value computed for each software component comprising "A." The manifest 202 also may include an integrity metric computed based on the collection of configuration parameters included in the base machine image. The manifest 202 also may include a time stamp when the base machine image was created.

The first generation machine image 210 is a modified version of the base machine image 200. The first generation machine image 210 includes the various software components comprising "A" from the base machine image but may also include one or more additional software components collectively represented as "B." The additional software components of "B" may include security patches, antivirus software components, etc. "B" also may include additional or different configuration parameters. Thus the first generation machine image 210 includes both the "A" software components and configuration parameters from the base machine image 200 as well the "B" additional software components and/or configuration parameters not included in the base machine image 200.

The first generation machine image 210 has a corresponding manifest 212. In the disclosed embodiments, the manifest 212 for the first generation machine image 210 includes identifiers of only the software components and/or configuration parameters designed as "B" that were not included in its parent machine image (i.e., the base machine image 200). The manifest 212 for the first generation machine image 210 also includes an integrity metric (e.g., a hash) of the software components and/or configuration parameters representing "B." As such, to verify the integrity of the first generation machine image 210, both manifests 202 and 212 are used during the validation process described below.

The second generation machine image 220 is a modified version of the first generation machine image 210. The second generation machine image 220 includes the various software components comprising "A" and "B" from the first generation image but may also include one or more additional software components collectively represented as "C," which may include additional or different configuration parameters. Thus the second generation machine image 220 includes both the "A" and "B" software components and configuration parameters from the first generation machine image 210 as well the "C" additional software components and/or configuration parameters not included in the first generation machine image 210.

The second generation machine image 220 has a corresponding manifest 222. In various embodiments, the manifest 222 for the second generation machine image 220 includes identifiers of only the software components and/or configuration parameters designed as "C" that were not included in its parent machine image (i.e., the first generation machine image 210). The manifest 222 for the second generation machine image 220 also includes an integrity metric (e.g., a hash) of the software components and/or configuration parameters representing "C." As such, to verify the integrity of the second generation machine image 220, all three manifests 202, 212, and 222 are used during the validation process described below. This latter point is illustrated in FIG. 2 in that a customer may have requested the second generation machine image 220 to be used to launch an instance on a host computer 110. The virtual machine manager 120 causes the target machine image (the second generation machine image 220 in this example) to be loaded on to the host computer. The various manifests 202, 212, and 222 may be used to validate the integrity of their respective content within the target second generation machine image 220. That is, the manifest 202 for the base machine image ("A") can be used to validate that content in the target second generation machine image 220 loaded onto host computer 110 that is identified in manifest 202. Similarly, the manifest 212 for the first generation machine image can be used to validate that content ("B") in the target second generation machine image 220 loaded onto the host computer 110, while the manifest 222 for the second generation machine image can be used to validate that content ("C") in the machine image.

If the full content of the machine image is successfully validated, then the virtual machine is caused to be launched on the host computer 110 using the validated machine image (second generation image 220 in the example of FIG. 2). If any of the content of the machine image cannot be successfully validated, the launch process for the virtual may be aborted and an error message generated and sent to the customer's user device 170. In other embodiments, the validation failure may be reported to the customer and the customer can be prompted to have the launch process continue nonetheless.

Figure 3:
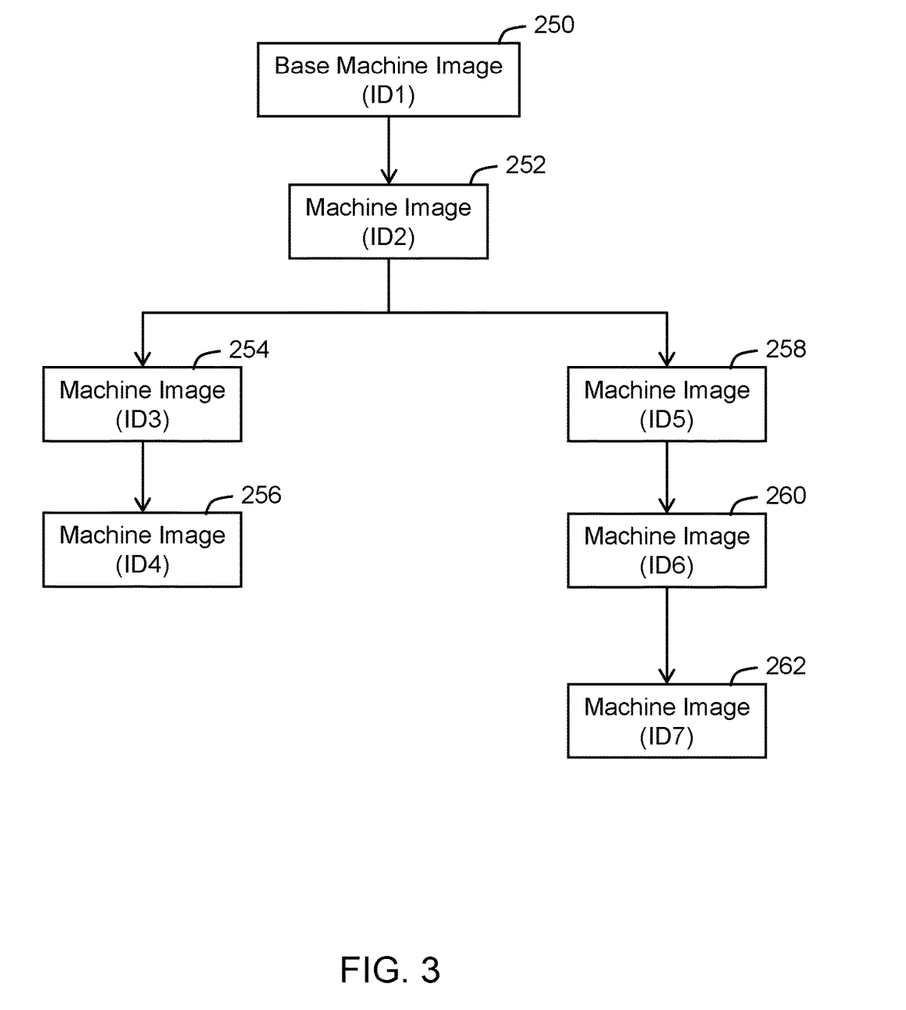
FIG. 3 shows another chain of machine images in accordance with various examples.

FIG. 3 shows another example of a machine image hierarchy containing two branches stemming from a common base machine image. The base machine image is designated as 250 and contains software components and configuration parameters. As noted above, each machine image has a unique identifier. The unique identifier for each machine image in the example of FIG. 3 is designated in parentheses as shown. For example, the machine ID for the base machine image 250 is ID1. Machine image 252 has been derived from the base machine image 250 and has an identifier of ID2. Machine images 254 and 258 (identifiers ID3 and ID, respectively) have been derived from machine image 252 but include different sets of added/changed software components and/or configuration parameters with respect to each other. That is, at least one software component and/or configuration parameter is different between machine images 254 and 258. Machine image 256 (ID4) has been derived from machine image 254, while machine image 260 (ID6) has been derived from machine image 258 and machine image 262 (ID7) has been derived from machine image 262.

Figure 4:
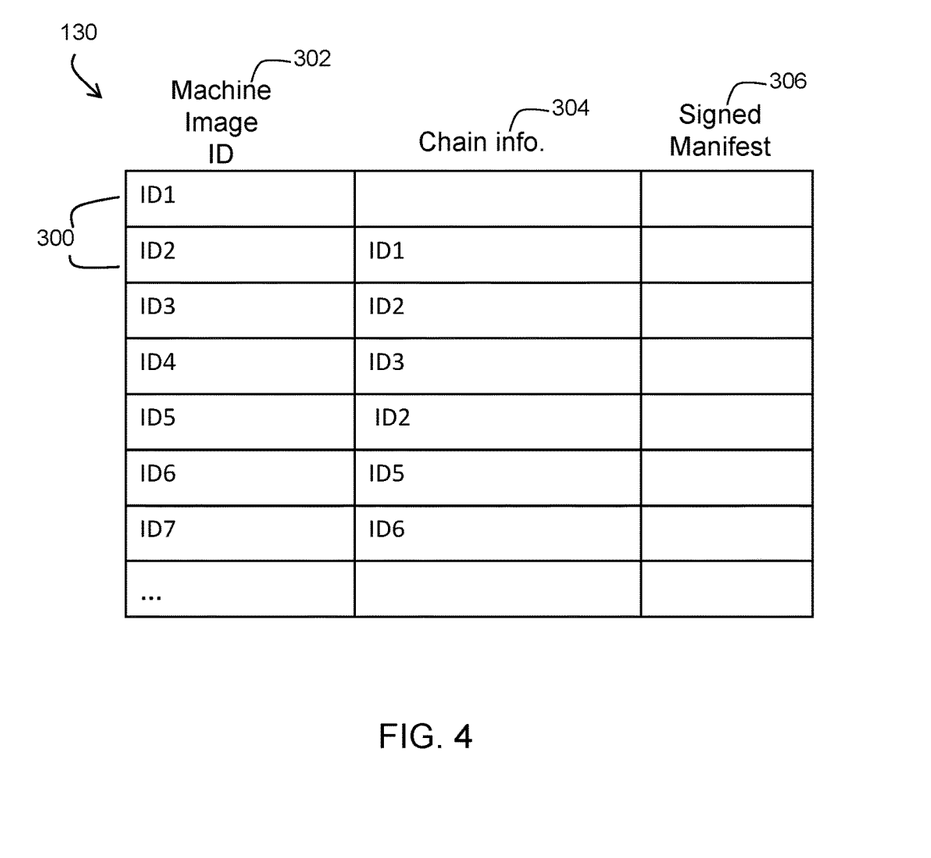
FIG. 4 shows an access control data structure containing chain information and signed manifests based on the machine images of the example of FIG. 4.

FIG. 4 illustrates an example of an access control data structure 130 based on the machine image chain of FIG. 3. The access control data structure includes multiple records 300. Each record 300 may include a machine image identifier 302, chain information 304, and a signed manifest 306, an additional information may be included as well. The machine image identifiers include ID1-ID7 from the example of FIG. 3. For a record 300 pertaining to a given machine image, the chain information 304 may include identifiers of the machine images that are in the ancestry chain for the given machine image. As the machine image having an identifier of ID1 is the base machine image for the chain shown in FIG. 3, there are no ancestors to the ID1 base machine image 250 and thus the chain information for that image contains no IDs of other machine images. However, machine image 252, which is derived directly form machine image 250, has the base machine image 250 as its one and only ancestor. Accordingly, ID1 is included in the chain information 304 for the machine image 252 (ID2). Similarly, machine image 254 has both the base machine image 250 and machine image 252 in its ancestry chain and thus ID1 and ID2 are included in the chain information 304 for machine image 254 (ID3). Machine image 256 (ID 4) has three ancestor machine images—ID1, ID2, and ID3—and all three of these IDs are included in its chain information in the access control data structure 130. Machine image 258 has the same two machine images as machine image 254 as its ancestors and thus has the same chain information (ID1 and ID2). Finally, machine images 260 and 262 have ancestor chains ID1, ID2, ID5 and ID1, ID2, ID5, ID6, respectively, and such identifiers are included in their respective chain information as shown in FIG. 4.

The access control data structure also includes the manifest for each respective machine image. In some embodiments, the manifests are signed for added security in establishing their authenticity. Each manifest may be signed based on the author of the respective machine image, such as based on the customer account for which the machine image is created. A manifest also may be signed by a signing authority service within the service provider network. In other embodiments, the manifests may not be assigned, and in yet other embodiments, some manifests may be signed while others are not signed.

Machine image manifests are created and saved as described below when a new offspring machine image is created, and then used to validate the machine image when a customer wants to launch an instance using that machine image. Both processes—manifest creation and their use to validate a machine image—are described below.

Figure 5:
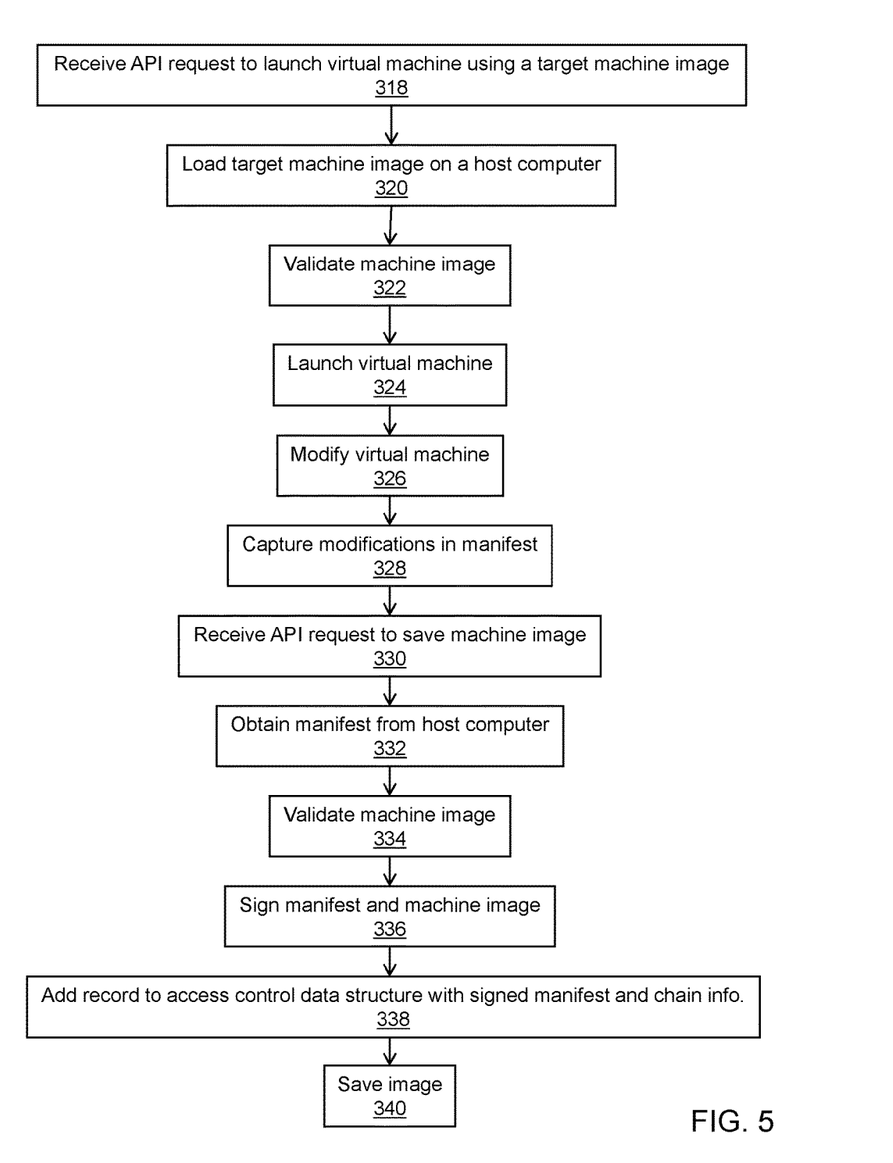
FIG. 5 shows a method in accordance with various examples.

Referring again to FIG. 1, each host computer 110 includes a virtual machine validation agent 114 which comprise program instructions outside the virtual machine. In some embodiments, the virtual machine validation agent 114 is part of the virtualization system (e.g., hypervisor). When executed, the virtual machine validation agent functions to validate a machine image before it is used to launch a virtual machine 112. The virtual machine 112 includes a manifest agent 113 which executes within the virtual machine to create a manifest 116 upon the customer making modifications to an existing executed virtual machine as described herein. The manifest agent 113 may be part of the machine image used to boot the virtual machine. An illustrative workflow describing the launch of a virtual machine and subsequent creation of a modified version of the machine image used to launch the virtual machine is shown in FIG. 5. The operations may be performed in the order shown, or in a different order. Further, two or more of the operations may be performed concurrently rather than sequentially.

At 318, the workflow may include receiving an API request to launch a virtual machine using a target machine image. A customer may interact with a user device 170 to request the launch of a virtual machine using a particular machine image. The customer may only want to launch the virtual machine for the purpose of making one or more modifications to it to create a new machine image, or the customer may want an application to execute within the virtual machine to also perform usable work while also making modifications to the virtual machine. The customer submits a request to an API to launch the virtual machine. The request may be submitted through a command line interface, a console or other form of graphical user interface, a script, etc. The API request may include the ID of the target machine image to use to launch the virtual machine. In some embodiments, the API request may be received and processed by the virtual machine manager 120.

At 320, the virtual machine manager 120 may respond to the API request by causing the target machine image to be loaded onto a host computer 110. The host computer 110 may be selected by the virtual manager 120 based on the specific type of machine image identified in the launch request, availability of host computers, and other factors. The virtual machine manager 120 may submit a request (e.g., an API request) containing the ID of the target machine image to the machine image storage 125 to retrieve a copy of the target machine image and cause the copy to be loaded on to the storage drive of the host computer selected to host the virtual machine. The target machine image is transmitted across the internal network 145 to the selected host computer and loaded on to its drive.

At 322, the method further includes validating the target machine 322 before it is used to launch the requested virtual machine. The validation process may include validating the signatures of the machine image and its associated manifest as well as validating the integrity metrics contained in the manifest. An illustrative embodiment of the validation process is described below with regard to FIGS. 6 and 7. Successful validation of the machine image results in an increased assurance by the customer attempting to launch a virtual machine using the machine that the machine image is error free and trustworthy—that is, that a trusted entity created the machine image and that no modifications have been made to the machine image that were not authorized by the trusted entity.

At 324 (assuming the machine image is successfully validated), the virtual machine is launched using the machine image. Launching the virtual machine image may include any one or more of a variety of operations such as reserving resources of the host computer for the hypervisor that manages the virtualizations for the virtual machine, booting the operating system within the virtual machine, applying whatever configuration settings are contained in the virtual machine (e.g., firewall rules), obtaining and applying an IP address for the virtual machine, etc. The launch of the virtual machine may be initiated and controlled by a hypervisor.

The customer may make one or more modifications to the virtual machine at 326. Examples of modifications have been provided above such as installation of security patches, antivirus agents, applications, etc. as well as changing of existing configuration parameters or imposing additional configuration parameters such as new firewall rules, etc. Such modifications may be captured by the manifest agent 113 executing with the virtual machine and recorded in a manifest 116 as indicated at 328. The manifest for the virtual machine being modified may be created and stored locally on the host computer 110. The virtual manifest agent 113 creating the manifest 116 may add an entry to the manifest recording each modification made by the customer. The record for each modification may contain information such as an identifier of the specific software agent added to the virtual machine (e.g., name, version number, etc.). The manifest agent 113 also may compute an integrity metric (e.g., a hash) specific to the modification made to the virtual machine and store the integrity metric in the manifest as well. A time stamp associated with the modification also may be included in the manifest to indicate when (e.g., date and time) the modification was made. Further, the manifest agent 113 also may add an identifier of the customer to the manifest to indicate who made or otherwise authorized the modification to be made. The manifest thus may indicate who modified the parent machine image, when the modification was made, what modifications were made, and an integrity metric for each modification that can be independently verified when attempting to use the machine image to launch a future virtual machine.

At some point (i.e., after the desired modifications are made to the virtual machine), the customer may want to save the modified virtual machine as a new machine image. The customer may submit a "save" machine image API request, which may be received and processed at 330 by the virtual machine manager 120. The virtual machine manager 120 may cause a snapshot of the virtual machine executing on the host computer 110 to be taken and saved to the machine image storage 125. The virtual machine manager 120 may generate, or cause to be generated, a unique ID to be associated with the newly created and stored machine image. Alternatively, the machine image storage 125 may comprise a service that auto-generates a unique ID for each new machine image added to the storage.

At 332, the workflow also may include obtaining a copy of the manifest for the new machine image from the host computer 110. The host computer may transmit the manifest upon request to the virtual machine manager 120. The manifest may be received by the virtual machine manager and then stored in the access control data structure 130, or received directly into the access control data structure 130 without passing through the virtual machine manager 120.

At 334, the virtual machine manager 120 may validate the newly created machine image. Validation of the machine image may comprise accessing the manifest to obtain the list of components added to the machine image with respect to its parent machine image and the associated integrity metrics. The machine manager 120 may compute new integrity metrics for those components of the machine image and compare the newly computed integrity metrics against the integrity metrics contained in the manifest. The machine image is successfully validated if all of the newly computed integrity metrics match the integrity metrics from the manifest. If there is a mismatch, an error message may be generated and presented to the customer. If the machine image is successfully validated, the manifest and the machine image are signed by service provider at 336.

At 338, a record may be added to the access control data structure 130 corresponding to the newly created machine image. The record may include, for example, the ID and the signed manifest of the new machine image. The chain information for the new machine image also may be included in the record. The chain information can be determined by the virtual machine manager 120. The chain information, as described above, includes the IDs of all ancestors to the newly created machine image. The ID of the immediate parent machine image is the machine image ID that was included in the original launch request at 318. Any parentage chain information to the parent machine image can be retrieved from the record in the access control data structure 130 pertaining to the parent machine image itself. At 340, the newly created and signed machine image can be stored in the machine image storage 125. The machine image can then be used to launch virtual machines based on the machine image from storage 125.

Figure 6:
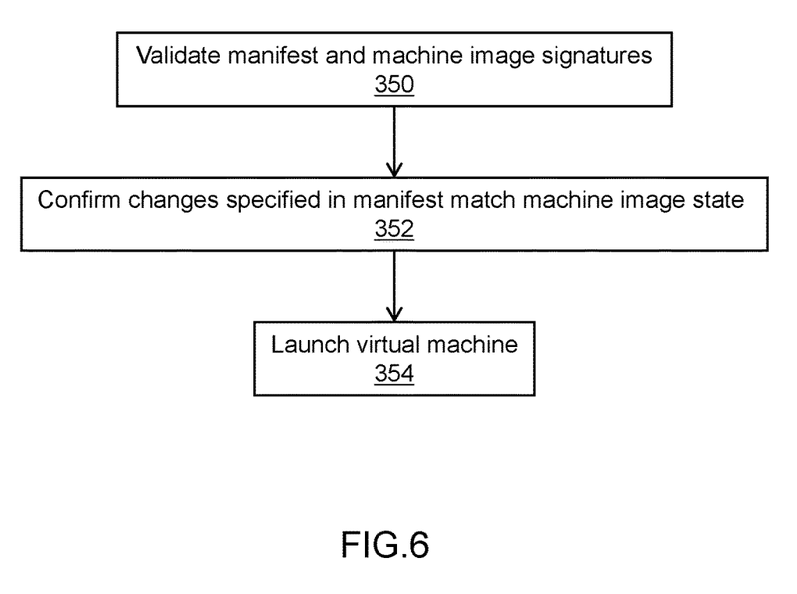
FIG. 6 shows a method of validating a machine image pending its use to launch a virtual machine using the manifest for the machine image in accordance with various examples.

FIG. 6 provides additional information about the machine image validation process of operation. The operations may be performed in the order shown, or in a different order. Further, two or more of the operations may be performed concurrently rather than sequentially.

At 350, the method may comprise validating the signatures of the machine image and the manifest associated with the machine image using any suitable signature authentication process. The signature validation process may be performed as part of operation 322. Alternatively, it may be performed prior to loading the machine image onto the host computer.

At 352, the method may include confirming that the changes specified in the manifest match the actual state of the machine image. For example, if the manifest indicates that a particular antivirus agent has been included in the machine image, the check of operation 352 may confirm that that particular antivirus agent is present in the machine image. This operation also may include computing an integrity metric for each software agent (or collection of configuration parameters) and comparing each such integrity metric to the corresponding integrity metrics in the manifest. If the integrity metrics are all successfully confirmed, then the virtual machine is launched, as noted above, at 354.

Figure 7:
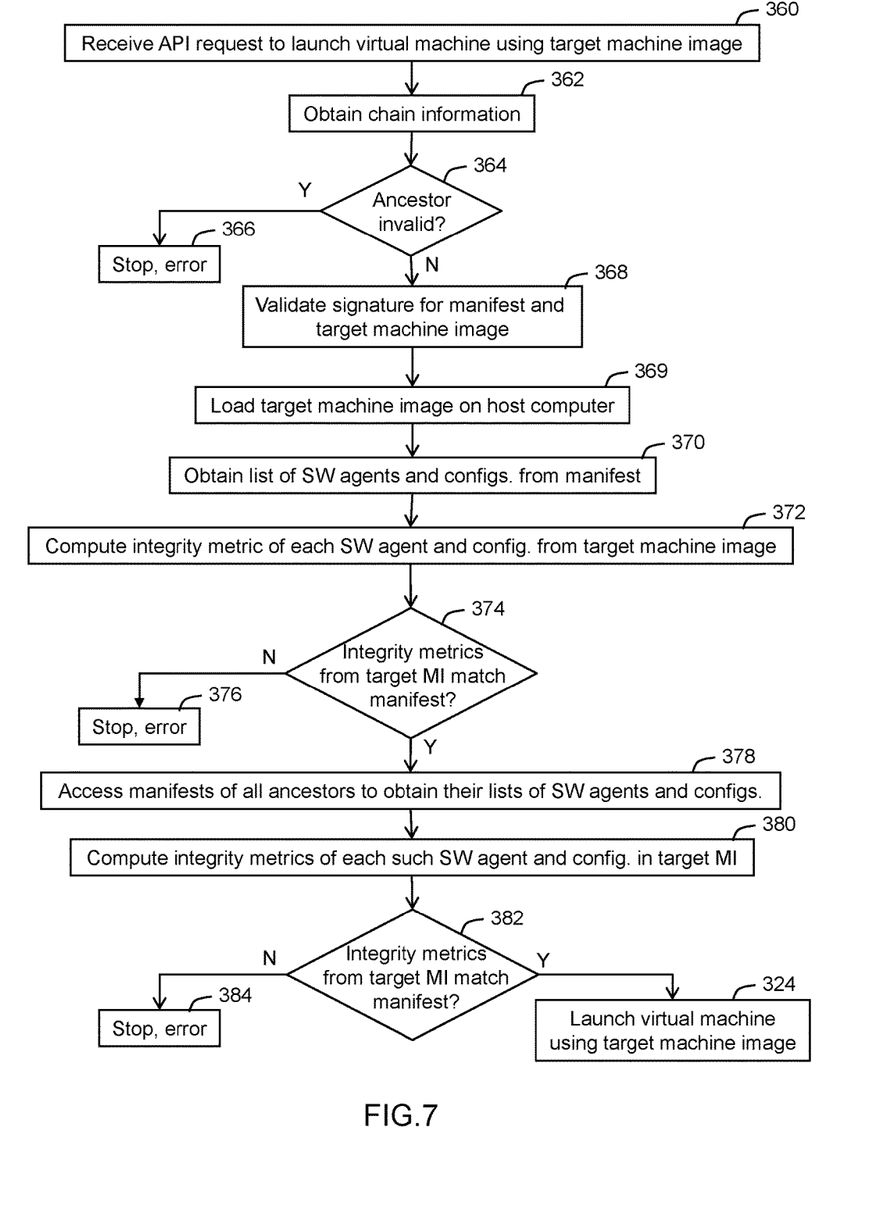
FIG. 7 shows another embodiment of a method of validating a machine image pending its use to launch a virtual machine using the manifest for the machine image in accordance with various examples.

FIG. 7 shows yet another embodiment of a method for validating a machine image and using it to launch a virtual machine. As for the other method embodiments, the operations may be performed in the order shown, or in a different order. Further, two or more of the operations may be performed concurrently rather than sequentially. At 360, the method includes receiving an API request to launch a virtual machine using a target machine image. As explained above, a customer may interact with a user device 170 to request the launch of a virtual machine using a particular machine image. The customer may only want to launch the virtual machine for the purpose of making one or more modifications to it to create a new machine image, or the customer may want an application to execute within the virtual machine to also perform usable work while also making modifications to the virtual machine. The customer submits a request to an API to launch the virtual machine. The request may be submitted through a command line interface, a console or other form of graphical user interface, a script, etc. The API request may include the ID of the target machine image to use to launch the virtual machine. In some embodiments, the API request may be received and processed by the virtual machine manager 120.

At 362, the chain information for the target machine image is retrieved from the access control data structure 130. As explained previously, the chain information includes identifiers of the machine images that are ancestors to the target machine image (e.g., parent, grandparent, etc.). The virtual machine manager 120 may perform this operation by accessing the access control data structure 130. In some embodiments, a given machine image in a chain of machine images (e.g., FIGS. 2 and 3) may be deemed to be defective for some reason. For example, a bug may be found to exist in the operating system or one of the other elements of the machine image. In such embodiments, that particular machine image may be marked as being invalid in its corresponding record in the access control data structure (e.g., in its manifest). The record may have a valid/invalid bit that may be set to one logic state or another to indicate whether the machine image is valid or invalid. If the machine is valid, it can be used to launch a virtual machine, but if the machine image is marked as invalid, the virtual machine manager 120 in some embodiments will not honor a request to launch a virtual machine using that machine image. In other embodiments, the virtual machine manager may generate and send an alert message to the customer of a possible problem with the machine image and prompt the customer to confirm whether the virtual machine should be launched. At 364, as may be determined by the virtual machine manager, if any of the machine images in the ancestry chain of the target machine image is marked as invalid (including the target machine image itself)), the virtual machine manager may refuse to launch the target virtual machine or prompt the customer for confirmation after providing an alert message as described above.

If none of the virtual machines in the lineage chain of the target machine image are invalid, then at 368, the virtual machine manager 120 validates the signatures of the target machine image and the manifest for the target machine image. If a signature is not validated, then the launch process may be aborted. Otherwise, control continues with operation 369 in which the target virtual machine is transmitted to the host computer on which the virtual machine is to be launched. The virtual machine manager 120 also may cause the manifest from the access data structure 130 to be transmitted to the host computer as well. The machine image is copied on to the storage drive of the host computer and the manifest may be stored in the host computer's memory pending use by the virtual machine validation agent 114 as described below.

At 370, the virtual machine validation agent 114 in the host computer accesses its local copy of the manifest to obtain a list of the software agents and configurations contained in the manifest (i.e., the modifications that were made to the target machine image's immediate parent to create the target machine image). At 372, an integrity metric is computed by, for example the virtual machine validation agent 114, for each software agent and/or the configuration parameters from the target machine image. Although any of a variety of algorithms can be used to compute integrity metrics, the particular algorithm used to compute the integrity metric should the same algorithm that was used to compute the integrity metric in the first place that is stored in the manifest. If the same algorithm is used, then the integrity metrics can be compared. At 374, the virtual machine validation agent 114 determines whether the newly computed integrity metrics match those in the manifest. If any integrity metrics do not match, then at 376 the launch process may be aborted and the virtual machine validation agent 114 may send an alert message to the virtual machine manager or another entity in the provider network to forward on an alert message to the customer.

If the integrity metrics computed by the virtual machine validation agent 114 match the integrity metrics contained in the manifest for the machine image, then confidence is high that the modifications made to the target machine image's parent are present in the target machine and that they have not been further modified. However, what remains uncertain is whether any of the rest of the target machine image (i.e., the portion that is the same as the parent machine image) has been modified that is not captured in the target machine image's manifest.

At 378, the manifests of all of the machine images in the ancestry chain of the target machine image are accessed to obtain their lists of software agents and configurations. That collective list of software agents and configurations represents the remaining portion of the target machine image that remains to be validated. This operation may be performed by the virtual machine manager 120 using the chain information obtained at 362 and then accessing the manifests of the machine images identified in the chain information to identify those software agents/configuration parameters from the manifests as well as obtain their corresponding integrity metrics. The collective list of software agents and configurations as well as the corresponding integrity metrics then may be transmitted to the host computer for use by the virtual machine validation agent 114. At 380, the agent computes an integrity metric for each such software agent and configuration parameters in the target machine image. If, any of the computed integrity metrics fail to match the integrity metrics from the manifests (as determined at 382), then at 384, the launch process may be aborted and the virtual machine validation agent 114 may send an alert message to the virtual machine manager or another entity in the provider network to forward on an alert message to the customer. Otherwise, the virtual machine is launched using the target machine image at 324.

In the embodiment described above, the manifests are transmitted to the host computer on which the virtual machine is to be launched and the virtual machine validation agent 114 on that host computer recomputes and validates the integrity metrics. In other embodiments, the validation of the integrity metrics of the relevant manifests is performed within the management system 140, such as through coordination by the virtual machine manager 120. For example, the virtual machine manager 120 may access the access control data structure 130 to obtain the identities of the various software agents in the target and ancestor machine images, and then directly access the corresponding machine images from the machine image storage 125 to compute the integrity metrics. If the integrity metrics are successfully validated, the target machine image then may be transmitted to a host computer for the virtual machine to be launched.

Figure 8:
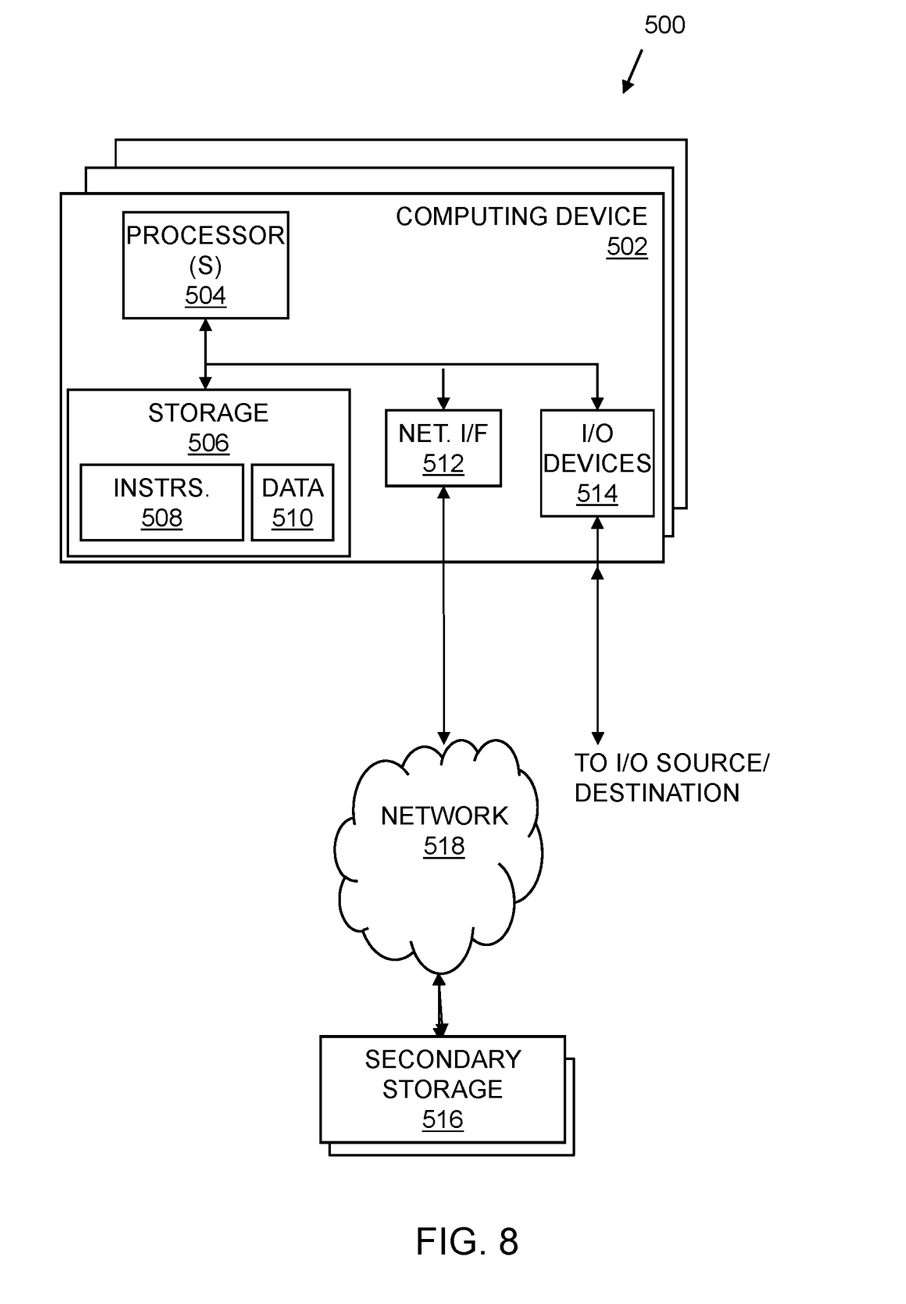
FIG. 8 illustrates a computing device usable to implement the systems described herein.

FIG. 8 shows a schematic diagram for a computing system 500 suitable for implementation of any of the virtual machine manager 120, machine storage 125, access control data structure 130, virtual machines 112, and virtual machine validation agents 114, as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various services described herein.

Each computing device 502 includes one or more processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the virtual machine manager 120, machine storage 125, access control data structure 130, virtual machines 112, and virtual machine validation agents 114 and other components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
one or more computing devices configured to implement a virtual machine manager;
a storage subsystem configured to store machine images for use in launching virtual machines and to store manifests for the machine images, wherein the manifest for each machine image includes identifiers of modifications made to a predecessor machine image from which the machine image was derived and an integrity metric for each such modification; and
a plurality of host computers on which to execute virtual machines using the machine images from the storage subsystem, each host computer containing an executable virtual machine validation agent;
wherein, in response to a request to execute a virtual machine using a target machine image, the virtual machine manager is configured to cause the target machine image and the manifest associated with the target machine image, as well as manifests associated with machine images from which the target machine image is derived to be retrieved from the storage subsystem and to be transmitted to one of the plurality of host computers;
wherein the host computer's virtual machine validation agent is configured to compute an integrity metric for each modification within the target machine image identified in the retrieved manifests, compare each computed integrity metric to a corresponding integrity metric contained in the respective manifests; and
wherein the host computer is configured to launch the virtual machine from the target machine image in response a successful validation of the machine image.

2. The system of claim 1, wherein the modifications include at least one of a software agent added to the ancestor machine image and a configuration parameter, and wherein the integrity metrics included in the manifest for the modifications include a hash computed based on each such modification.

3. The system of claim 1, wherein:
in response to modifications made to the virtual machine after its launch to produce a modified machine image, a manifest agent within the virtual machine is configured to construct a new manifest that specifies the modifications included in the modified machine image; and
the virtual machine manager causes a copy of the modified virtual machine to be stored on in the storage subsystem, a unique machine image identifier to be assigned to the modified virtual machine, and a record to be added to an access control data structure configured to store manifests, the added record including the assigned unique machine image identifier, chain information including an identifier of the target virtual machine, and the manifest specifying the modifications made to the virtual machine after its launch.

4. The system of claim 1, wherein the target machine image is a member of a lineage chain that includes machine images derived from one another and wherein the system further comprises a data structure stored in the storage subsystem, the data structure comprising a plurality of records, each record including an identifier of a given machine image, a signed manifest associated with the given machine image, and chain information including an identifier of a machine image in the lineage chain of the given machine image and from which the given machine image was derived.

5. The system of claim 4, wherein the lineage chain of the target machine image includes a plurality of machine images, and wherein the virtual machine validation agent on the host computer on which the virtual machine is to be launched using the target machine image is configured to compute an integrity metric of each modification identified in the manifest associated with each virtual machine of the lineage chain and compare each such computed integrity metric to the integrity metrics of the corresponding manifests.

6. A system, comprising:
one or more processors coupled to memory, the one or more processors configured to implement a virtualization system including a virtual machine validation agent;
wherein the virtual machine validation agent is configured to:
validate a digital signature of a signed manifest corresponding to a target machine image usable to launch a virtual machine, wherein the manifest includes identifiers of modifications made to another virtual machine image and an integrity metric for each modification;
compute an integrity metric of each modification identified in the manifest for the target machine image; and
determine that at least one computed integrity metric for the target machine image does not match the corresponding integrity metric included in the manifest; and
generate an error indicator.

7. The system of claim 6, wherein the modifications include at least one of a software agent added to the ancestor machine image and a configuration parameter.

8. The system of claim 6, wherein the integrity metrics are hash values.

9. The system of claim 6, further comprising one or more computing devices configured to execute a message service configured to generate a message indicative of the error indicator and including a prompt as to whether the virtual machine is to be launched.

10. The system of claim 6, wherein the machine image validation agent is further configured to determine that the computed integrity metrics for the target machine image match the corresponding integrity metric included in the manifest and, in response, cause a virtual machine to be launched using the target machine image.

11. The system of claim 6, wherein the machine image validation agent is further configured to:
determine that the computed integrity metrics for the target machine image match the corresponding integrity metric included in the manifest;
compute a second integrity metric of a software agent in the target machine image that is identified in a manifest for another machine image mapped to the target machine image in an access control data structure and determine that the second integrity metric matches a corresponding integrity metric in the other machine image; and
cause a virtual machine to be launched using the target machine image.

12. The system of claim 6, further comprising a storage device containing an access control data structure that is configured to store, for each of plurality of machine images, an identifier of the machine image, a signed manifest for the machine image, an identifier of a parent machine image to which modifications are contained in the machine image, and a valid indicator that when set to a value indicative of an invalid machine causes all machine images descendant from the machine image to fail to launch a virtual machine.

13. The system of claim 6, wherein at least one modification is inclusion of an additional software agent into the machine image, and wherein the identifier in the manifest includes a name of the added software agent, and wherein the manifest includes a timestamp for each of the modifications indicative of when each such modification was made.

14. A method, comprising:
launching a virtual machine on a host computer using a first machine image;
detecting a modification made to the virtual machine;
computing an integrity metric of the detected modification;
recording a metadata description of the modification and the integrity metric in storage within the host computer; and
saving the modified virtual machine as a modified virtual machine image in a centralized storage subsystem configured to store machine images to be loaded on host computers for execution to instantiate virtual machines.

15. The method of claim 14, further comprising:
detecting an additional modification made to the virtual machine;
computing a separate integrity metric for the additionally detected modification; and
recording a separate metadata description of the additionally detected modification and the separately computed integrity metric to the storage of the host computer.

16. The method of claim 14, further comprising, before launching the virtual machine, validating the first machine image using a manifest associated with the first machine image, the manifest including metadata of modifications made to another virtual machine image to create the first machine image and an integrity metric for each such modification.

17. The method of claim 14, further comprising transmitting a second machine image containing the modification, the metadata description, and the integrity metric to a storage subsystem in a provider network, and through a data structure, mapping the second machine image to the first machine image.

18. The method of claim 14, further comprising, before launching the virtual machine:
transmitting the first machine image and first and second manifests to the host computer, wherein the first manifest contains metadata and an integrity metric of a modification made to a second machine image from which the first machine image was created, and wherein the second manifest contains metadata and an integrity metric of a modification of a third machine image from which the second machine image was created; and
validating the first machine image using the first and second manifests.

19. The method of claim 18, further comprising:
receiving a third manifest from the host computer containing the recorded metadata description of the modification and the integrity metric from the storage within the host computer;
validating a fourth machine image which includes the detected modification;
signing the fourth machine image and the third manifest;
adding a record to a data structure that contains the third manifest and chain information which includes unique identifiers of each of the first, second, and third machine images; and saving the fourth machine image in a storage subsystem within a provider network.

20. The method of claim 14, wherein computing the integrity metric includes computing a hash value.

* * * * *